United States Patent [19]
McKinney

[11] Patent Number: 4,779,278
[45] Date of Patent: Oct. 18, 1988

[54] LASER APPARATUS AND METHOD FOR DISCRIMINATING AGAINST HIGHER ORDER MODES

[75] Inventor: Robert E. McKinney, Winter Park, Fla.

[73] Assignee: Laser Photonics, Inc., Orlando, Fla.

[21] Appl. No.: 938,266

[22] Filed: Dec. 5, 1986

[51] Int. Cl.$^4$ ............................................. H01S 3/098
[52] U.S. Cl. ........................................ 372/19; 372/21; 372/93; 372/101
[58] Field of Search .................... 372/19, 101, 100, 21, 372/24, 92, 94, 93, 95, 98, 99, 107, 108

[56] References Cited

U.S. PATENT DOCUMENTS

| | | | |
|---|---|---|---|
| 3,777,280 | 12/1973 | Pohl | 372/19 |
| 4,088,964 | 5/1978 | Clow | 372/19 |
| 4,494,235 | 1/1985 | Guch, Jr. et al. | 372/23 |

FOREIGN PATENT DOCUMENTS

| | | | |
|---|---|---|---|
| 2804046 | 8/1979 | Fed. Rep. of Germany | 372/107 |
| 0190382 | 12/1982 | Japan | 372/101 |

OTHER PUBLICATIONS

Kortz et al; "Stability and-Internal Variable Lenses"; Applied Optics/vol. 20, No. 23/1 Dec. 1981; pp. 4124–4134.

J. K. Lasers Promotional Brochure, J. K. Lasers, A Lumonics Group Company (Copy in file).
Line Lite Laser Promotional Brochure, Line Lite Laser Corp., 430 Ferguson Drive & Bldg. 4, Mountain View CA.
Optics Communications, vol. 37, No. 5 (Jun., 1981) pp. 359–362–Hanna et al, Article, entitled "Large vol. Tem$_{00}$ Mode Operation of Nd:Yag Lasers".
SPIE ECOOSA Publication (Amsterdam, 1984), Gobbi et al, Article-p. 71, "Stable Telescopic Resonators, Instable Resonators and New-Engineering".

Primary Examiner—James W. Davie
Assistant Examiner—Xuan T. Vo
Attorney, Agent, or Firm—Duckworth, Allen, Dyer & Doppelt

[57] ABSTRACT

Disclosed is a laser apparatus and a related method for use with a laser medium of a type which emits a beam of coherent laser energy having both low and high order modes. End reflectors are provided for reflecting at least a portion of the energy in the beam back through the laser medium, and positive and negative lens elements are positioned on opposing sides of the lasing medium so that discrimination against the higher order modes is achieved by non-linearly amplifying the reflected beam portion passing through the lasing medium.

15 Claims, 1 Drawing Sheet

LASER APPARATUS AND METHOD FOR DISCRIMINATING AGAINST HIGHER ORDER MODES

BACKGROUND OF THE INVENTION

1. Field of the Invention

The present invention relates to laser apparatus and methods, and particularly relates to techniques for discriminating against higher order modes.

2. Description of the Prior Art

Techniques have been developed in the past to suppress higher order modes in a laser beam, in order to control the Gaussian energy distribution across the lase1 beam. One technique for achieving higher order mode discrimination is the utilization of a laser cavity having end mirrors spaced as far apart as is feasible, and by utilizing an aperture in the resonator to limit the beam passing between the end reflectors of the cavity to a small dimension in the center of the beam where the energy of the lower order modes is concentrated. While this technique is effective for eliminating higher order modes, the result is a significant reduction in the amount of energy that passes back and forth through the laser medium between the end reflectors to stimulate continued laser oscillation.

There have been suggestions in the prior art for utilizing optical elements in a laser cavity in order to control mode configuration, divergence and collimation. In such prior art arrangements, a positive lens element and a negative lens element are positioned along the laser energy beam path between the two end reflectors, but with the laser medium located outside of the divergent beam path between the two lens elements.

An article entitled "Stability and Beam Divergence of Multimode Lasers With Internal Variable Lenses" by Kortz et al in *Applied Optics*, Volume 20, Number 23, December 1981 discloses various laser resonator configurations utilizing internal lens combinations.

It is also known in the prior art to utilize curved end mirrors which achieve some degree of non-linear amplification in the laser medium during successive passes of the reflected beam through the lasing medium.

SUMMARY OF THE INVENTION

The present invention contemplates a laser apparatus and a related method having means including a lasing medium for emitting a beam of coherent laser energy having both low order and high order modes. Means, such as reflective end mirrors, are provided for reflecting at least a portion of the energy in the beam back through the lasing medium so that subsequent passes of the reflected beam portion will achieve laser oscillation. In accordance with this invention, light transmissive means are provided for non-linearly amplifying laser energy through the lasing medium during successive passes of the reflective beam portion, in order to achieve discrimination against higher order modes.

In order to achieve this non-linear amplification, optical means are provided within the laser cavity and on opposing sides of the lasing medium to render the beam portions reflected during successive passes "off axis" (i.e., divergent) with respect to the otherwise collimated reflected beam. The non-linear amplification discriminates against the higher order modes by utilizing the higher concentration of energy at the center of the lasing medium to intensify the amplification of the lower order modes which are also centered within the laser beam, and to reduce the amplification of the higher order modes, the energy of which tends to be distributed outwardly from the center of the laser beam.

In a preferred embodiment of the present invention, the optical elements comprise a Galilean telescope including a positive lens element and a negative lens element which are positioned on opposing sides of the lasing medium, i.e., a solid state lasing rod. For purposes of this disclosure, the term "positive lens element" refers to a convergent light transmissive lens such as a plano-convex lens. The term "negative lens element" refers to a divergent lens element, such as a conventional light transmissive plano-concave lens.

As thus described, the positive and negative lens elements positioned on opposite sides of the lasing medium provide a laser energy transmissive optical means for non-linearly amplifying the laser energy as the energy makes successive passes through the lasing medium, in order to intensify the lower order modes and discriminate against higher order modes.

THE DRAWINGS

DETAILED DESCRIPTION

A preferred embodiment of the present invention will now be described with reference to FIG. 1.

Figure 1:
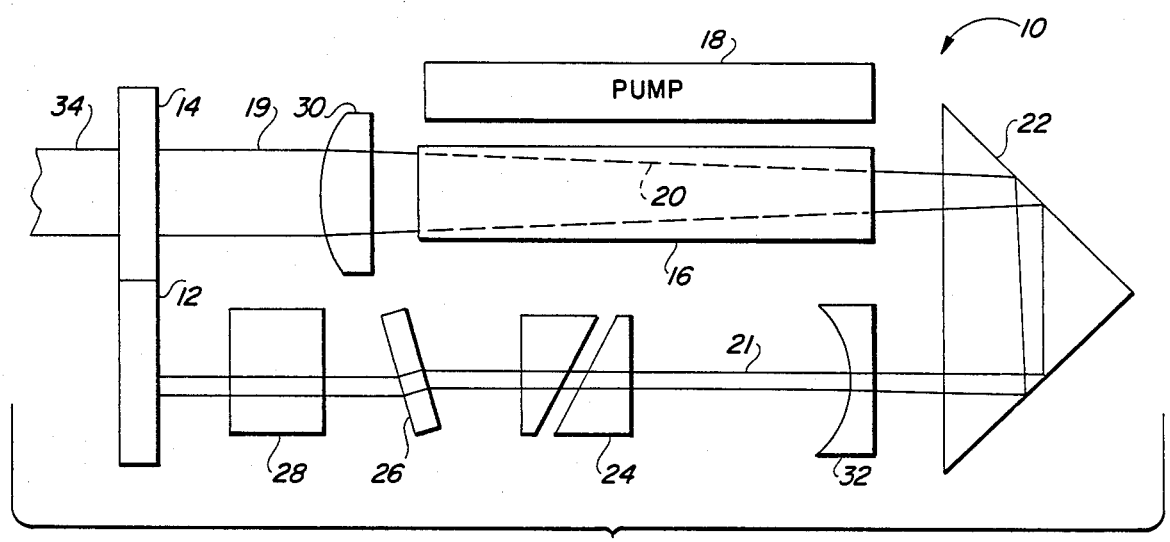
FIG. 1 is a schematic illustration of one embodiment of laser apparatus in accordance with the present invention.

The laser apparatus shown in FIG. 1 is referred to generally by the reference numeral 10. The apparatus includes end reflectors 12 and 14, such as conventional mirrors, with a first one of the mirrors 12 being fully reflective, and the second mirror 14 being partially reflective to permit a portion of the emitted laser energy to pass out of the cavity in which the apparatus 10 may be located. The emitted portion of the laser energy is shown as beam portion 34.

Figure 2:
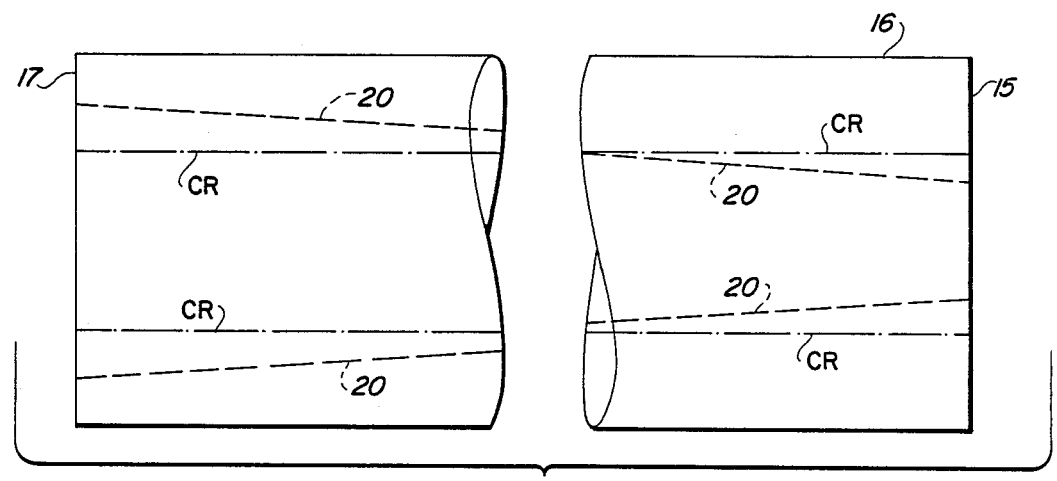
FIG. 2 is a side view, partially broken away, illustrating the laser rod portion of the apparatus shown in FIG. 1.

The laser apparatus 10 further includes a lasing medium 16; by way of example, an Nd:YAG laser rod is suitable. As is shown in FIG. 2, the laser rod 16 includes opposite end faces 15 and 17, from which a coherent, collimated beam of laser energy is emitted following pumping from a pump source 18 under appropriate conditions.

The apparatus 10 further includes a turning reflector, such as a corner cube 22, aligned to reflect the beam emitted from face 15 of the rod 16 through 180° and into a second leg of the beam toward the first reflector 12.

In accordance with the specific arrangement shown in FIG. 1, the apparatus 10 is further provided with an alignment prism pair 24, a polarizer 26 and a Q-switch element 28 between the corner reflector 22 and the first reflective end mirror 12. Further in accordance with the present invention, the laser apparatus 10 is provided with the optical elements of a Galilean telescope positioned along the beam path between the two end reflectors 12 and 14. Specifically, the telescope elements include a negative lens element 32 positioned along the beam path between the laser rod 16 and the first end reflector 12 and in the specific embodiment of FIG. 1, also between the corner reflector 22 and the first reflector 12. Additionally, the telescope elements include a positive lens element 30 positioned between the laser rod 16 and the second, partially transmissive end reflector 14.

In FIG. 1, reference numerals 19, 20 and 21 refer to portions of the laser energy beam after initial emission of laser energy from the rod 16. As will be understood by those skilled in the art, upon initial stimulation of the rod 16 by the pumping source 18 sufficient to achieve lasing, the energy emitted from the rod will be directed out of both of the ends 15, 17 of the laser rod 16 toward the respective end reflectors 12, 14. Portions of the energy in the beam will then be reflected back through the various optical elements 22, 24, 26, 28, 30 and 32 which are associated with the laser apparatus 10. After the reflective conditions have stabilized, the energy in the beam along the beam path between the two end reflectors 12 and 14 will assume the conditions generally shown in FIG. 1, in which the width of the beam portion 19 between the positive lens element 30 and the second end reflector 14 will be relatively wider than the beam portion 21 between the negative lens element and the first reflector 12. This is true because of the characteristics of the positive and negative lens element which cause the beam portion 20 between the two lens elements 30, 32 to converge for energy passing from the positive lens element 30 toward the negative lens element 32, and to diverge for energy passing through the negative lens element 32 toward the positive lens element 30. When the lens elements 30, 32 are properly positioned with the respect to the laser rod 16, a non-collimated portion 20 of the beam will pass through the laser rod 16, thus achieving an intensification of lower order modes and a discrimination against higher order modes, for the reasons discussed next with reference to FIG. 2.

It is known that the Gaussian energy distribution across a laser energy beam is such that the energy represented by lower order modes is concentrated in the central region of the beam, and that the energy for higher order modes tends to be concentrated at the outer portions of the beam. Accordingly, the non-linear passage of the energy beam 20 through the laser rod in the manner shown in FIG. 2 tends to intensify the energy of the lower order modes and discriminate against higher order modes. In FIG. 2, the central region CR is depicted by dotted lines; it will be understood that the boundaries of the central region portion are not definite, and will vary between lasers dependent upon various factors. The use of the telescope elements 30 and 32 provides a non-uniform amplification as the energy passes through the laser rod 16, as is represented by dotted lines 20 in FIG. 2. Thus, intensification of the lower order modes and discrimination against the higher order modes will always be achieved.

Figure 3:
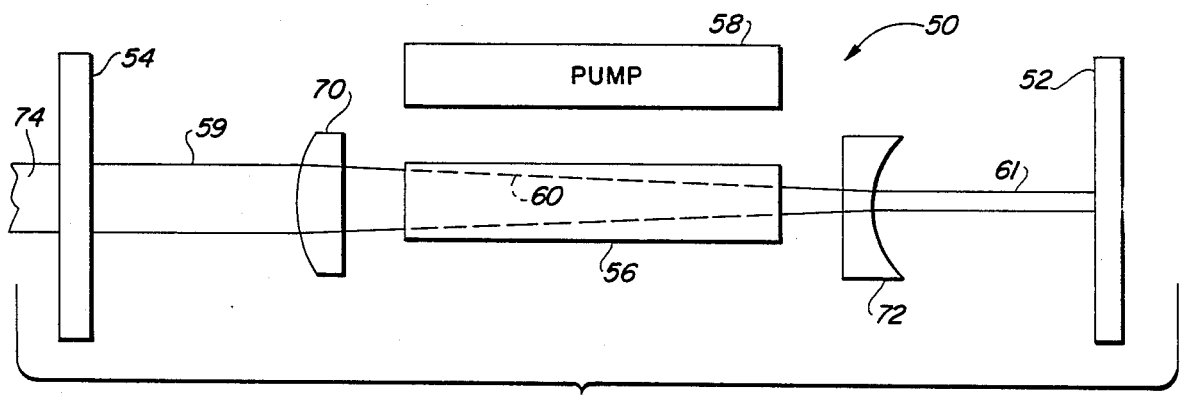
FIG. 3 is a schematic illustration of a second embodiment of laser apparatus in accordance with the present invention.

A second embodiment of laser apparatus in accordance with the present invention is shown in FIG. 3 and referred to generally by the reference numeral 50. The apparatus 50 includes first and second reflective end mirrors 52 and 54, respectively, with the second end mirror 54 being partially transmissive in the manner described above with reference to end mirror 14 of FIG. 1. The apparatus 50 includes a lasing medium 56, a pumping source 58 and a positive lens element 70 between the lasing medium 56 and the second end mirror 54, as well as a negative lens element 72 between the lasing medium 56 and the first end mirror 52. The arrangement of FIG. 3 likewise achieves a non-uniform amplification of the laser energy passing through the lasing medium 56, by proper positioning of the lens elements 70 and 72, in order to achieve the beam path configuration 60 shown in FIG. 3. It will also be understood by those skilled in the art that additional discrimination against higher order modes is achieved by the reduction in the beam width portion 61 between the negative lens element 72 and the first end reflector 52. With the second end reflector 54 being partially transmissive, a portion 74 of the beam 59 between the positive lens element 70 and the second end reflector 54 serves as an output from the laser apparatus 50.

It will thus be understood that the laser systems 10 and 50 shown in FIGS. 1 and 2 provide a means for intensifying lower order mode outputs and for discriminating against higher order mode outputs through the reduction in the beam diameter within the laser apparatus, by providing higher losses for the higher order modes through a decrease in the effective Fresnel number. The location of the positive and negative lens elements with respect to the lasing medium 16 of FIG. 1 and 56 of FIG. 3 further discriminates against the higher order modes by achieving non-uniform amplification as the energy passes through the lasing medium "off-axis" as the beam size converges from the positive to the negative lens elements, and diverges between the negative lens element and the positive lens element. It will be understood that by adjustment of these lens elements, the angle of propagation through the laser rod can be optimized to provide maximum energy extraction, as with the passive Q-switch element 28 in FIG. 1. The polarizing element 26 achieves linear polarization of the output beam.

It will be further appreciated that variations of the laser apparatus may be fabricated without departing from the spirit and scope of the present invention. For example, the apparatus 10 of FIG. 1 may be aligned by adjustments of the lens elements, and without utilizing the alignment wedges 24. Further, the polarizer 26 and the Q-switch element 28 may be omitted, which would result in an unpolarized output pulse duration approximately equal to that of the excitation source, rather than an output pulse of a duration controlled by the Q-switch. Finally, while the corner reflector 22 may be desirable in some applications, that element may also be omitted. Thus, the arrangement of FIG. 3 depicts a basic laser system which omits these various other optical elements.

We claim:

1. Laser apparatus comprising:
   means including a lasing medium capable of emitting a beam of coherent laser energy having both lower order and higher order modes;
   means for reflecting at least a portion of said energy in said beam back through said lasing medium; and
   means including a laser energy transmissive optical element for discriminating against said higher order modes by non-linearly amplifying said reflected beam portion passing through said lasing medium.

2. The laser apparatus recited in claim 1 wherein said optical element comprises a telescope having a positive lens and a negative lens, with said lasing medium interposed between said positive and negative lens.

3. Laser apparatus comprises:

means including a lasing medium for emitting a beam of coherent laser energy having both lower order and higher order modes;

means for reflecting at least a portion of said beam back through said lasing medium; and means including a Galilean telescope having a positive lens and a negitive lens with said lasing medium between said positive and negative lens for discriminating against said higher order modes.

4. Laser apparatus comprising:

a positive lens element aligned along a beam path;

a negative lens element aligned along said beam path;

a lasing medium aligned along said beam path between said positive and negative lens elements for emitting a beam of coherent laser energy along said beam path responsive to pumping from a pumping source; and means outside of said positive and negative lens elements and along said beam path for reflecting at least a portion of said laser energy in said beam back through said lasing medium and through said lens elements.

5. The laser apparatus recited in claim 4 wherein said reflecting means comprises a pair of end reflectors at opposite ends of said beam path.

6. The laser apparatus recited in claim 5 further comprising a corner reflector along said beam path between said negative lens element and said lasing medium.

7. The laser apparatus recited in claim 6 wherein said first reflector is fully reflective and said second reflector is only partially reflective, whereby an output portion of said beam passes through said second reflector.

8. The laser apparatus recited in claim 5 further comprising a polarizing element along said beam path between said negative lens element and said first end reflector.

9. The laser apparatus recited in claim 8 further comprising a Q-switch element between said negative lens element and said first end reflector along said beam path.

10. The laser apparatus recited in claim 9 further comprising alignment prism means between said negative lens element and said first end reflector along said beam path.

11. Laser apparatus comprising:

first and second end reflectors defining a beam path between said two reflectors;

a lasing rod along said beam path between said first and second end reflectors, said lasing rod capable of emitting a beam of coherent light along said beam path responsive to energization from a pumping source;

a pumping source;

a light transmissive, negative lens element along said beam path between said lasing rod and said first end reflector; and a light transmissive, positive lens element along said beam path between said lasing rod and said second end reflector.

12. A method for discriminating against higher order modes in a laser, comprising the steps of:

providing means including a lasing medium capable of emitting a beam of coherent laser energy having both lower and higher order modes;

positioning a positive lens element and a negative lens element each on opposite sides of said lasing medium; and reflecting at least a portion of energy in said beam back through said lasing medium and through said lens elements.

13. The method recited in claim 12 further comprising the step of polarizing said beam.

14. A method for maximizing the efficiency of lower order modes of laser energy extracted from a laser, comprising the steps of:

providing means including a solid lasing rod within a cavity for emitting a beam of coherent laser energy having both lower order and higher order modes;

successively reflecting portions of said emitted beam back through said lasing rod; and restricting said reflected portions to a central region of said lasing rod to intensify the energy within said lower order modes and to discriminate against said higher order modes.

15. A method for intensifying lower order modes in a laser energy output comprising the steps of:

aligning a Galilean telescope having a positive lens element and a negative lens element along a beam path;

aligning means along said beam path for emitting a beam of coherent laser energy along said beam path, including a lasing medium aligned along said beam path between said positive and negative lens elements; and thereafter reflecting at least a portion of said laser energy in said beam back through said lasing medium and through said lens elements.

* * * * *